(12) United States Patent
Shinde et al.

(10) Patent No.: US 11,443,166 B2
(45) Date of Patent: Sep. 13, 2022

(54) DATACENTER LEVEL UTILIZATION PREDICTION WITHOUT OPERATING SYSTEM INVOLVEMENT

(71) Applicant: Oracle International Corporation, Redwood Shores, CA (US)

(72) Inventors: Pravin Shinde, Zurich (CH); Felix Schmidt, Niederweningen (CH); Onur Kocberber, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 901 days.

(21) Appl. No.: 16/173,655

(22) Filed: Oct. 29, 2018

(65) Prior Publication Data

US 2020/0134423 A1    Apr. 30, 2020

(51) Int. Cl.
*G06F 9/44*    (2018.01)
*G06N 3/04*    (2006.01)
(Continued)

(52) U.S. Cl.
CPC ....... *G06N 3/0454* (2013.01); *G06F 11/0709* (2013.01); *G06F 11/0751* (2013.01);
(Continued)

(58) Field of Classification Search
None
See application file for complete search history.

(56) References Cited

U.S. PATENT DOCUMENTS

| 9,311,248 | B2 | 4/2016 | Wagner |
| 9,729,312 | B2 | 8/2017 | Bathen |

(Continued)

FOREIGN PATENT DOCUMENTS

| CN | 107 769 972 A | 3/2018 | |
| CN | 108712292 A * | 10/2018 | ........... G06N 3/0454 |

OTHER PUBLICATIONS

Wikipedia, "OpenFlow", http://en.wikipedia.org/wiki/OpenFlow, last viewed on Oct. 24, 2018, 4 pages.
(Continued)

*Primary Examiner* — Insun Kang
(74) *Attorney, Agent, or Firm* — Hickman Becker Bingham Ledesma LLP

(57) ABSTRACT

Embodiments use a hierarchy of machine learning models to predict datacenter behavior at multiple hardware levels of a datacenter without accessing operating system generated hardware utilization information. The accuracy of higher-level models in the hierarchy of models is increased by including, as input to the higher-level models, hardware utilization predictions from lower-level models. The hierarchy of models includes: server utilization models and workload/OS prediction models that produce predictions at a server device-level of a datacenter; and also top-of-rack switch models and backbone switch models that produce predictions at higher levels of the datacenter. These models receive, as input, hardware utilization information from non-OS sources. Based on datacenter-level network utilization predictions from the hierarchy of models, the datacenter automatically configures its hardware to avoid any predicted over-utilization of hardware in the datacenter. Also, the predictions from the hierarchy of models can be used to detect anomalies of datacenter hardware behavior.

22 Claims, 8 Drawing Sheets

(51) Int. Cl.
  *G06N 3/08* (2006.01)
  *G06F 11/07* (2006.01)
  *G06F 21/57* (2013.01)

(52) U.S. Cl.
  CPC ....... *G06F 11/0787* (2013.01); *G06N 3/0445* (2013.01); *G06N 3/084* (2013.01); *G06N 3/088* (2013.01); *G06F 21/57* (2013.01); *G06F 2221/034* (2013.01)

(56) References Cited

U.S. PATENT DOCUMENTS

| | | | |
|---|---|---|---|
| 9,760,395 | B2 | 9/2017 | Doherty et al. |
| 9,785,492 | B1 | 10/2017 | Neumann et al. |
| 10,216,558 | B1 | 2/2019 | Gaber et al. |
| 10,726,930 | B2 | 7/2020 | Sarkar et al. |
| 11,310,247 | B2 * | 4/2022 | Manadhata ............ G06N 20/00 |
| 2007/0168498 | A1 | 7/2007 | Lambert et al. |
| 2007/0294736 | A1 | 12/2007 | Brady et al. |
| 2015/0287057 | A1 * | 10/2015 | Baughman ............ H04L 41/147 705/7.31 |
| 2016/0028599 | A1 * | 1/2016 | Vasseur .................. H04L 41/16 370/252 |
| 2017/0372232 | A1 | 12/2017 | Maughan et al. |
| 2018/0027063 | A1 | 1/2018 | Nachimuthu et al. |
| 2018/0034966 | A1 | 2/2018 | te Booij et al. |
| 2018/0097744 | A1 * | 4/2018 | Hu ...................... H04L 67/1002 |
| 2018/0365581 | A1 | 12/2018 | Vasseur et al. |
| 2020/0118039 | A1 * | 4/2020 | Kocberber ............ G06N 5/003 |

OTHER PUBLICATIONS

Vmware, "How a Hypervisor-Converged Doftware-Defined Data Center Enables a Better Private Cloud", White Paper, dated 2014, 17 pages.

Software-Defined Networking (SDN) Definition, "Open Networking Foundation", https;//www.opennetworking.org/sdn-definition/ last viewed on Oct. 24, 2018, 11 pages.

SearchServerVirtualization, "Why You Need VM Monitoring", https://searchservervirtualization.techtarget.com/tip/Why-you-need-VM-monitoring-tools, last viewed on Oct. 30, 2018, 4 pages.

Oracle Technology Network, "Oracle Integrated Lights Out Manager", https://www.oracle.com/technetwork/server-storage/servermgmt/tech/integrated-lights-out-manager/index last viewed on Oct. 30, 2018, lpg.

OpenConfig, "Vendor-neutral, Model-Driven Network Management Designed by Users", dated 2016, 1 page.

Kanev et al., "Profiling a warehouse-scale computer", ISCA'15, Jun. 13-17, 2015, Portland, OR USA, 12 pages.

Iqbal et al., "Using SNMPV3 for Resources Monitoring of Hosted and Bare-Metal Hypervisors", dated May 2016, 9 pages.

Harrington et al., "An Architecture for Describing Simple Network Management Protocol (SNMP) Management Frameworks", dated Dec. 2002, 64 pages.

Dstat, "Linux Man Page", https://linux.die.net/man/1/dstat, last viewed on Oct. 30, 2018, 7 pages.

Claise et al., "Specification of the IP Flow Information Export (IPFIX) Protocol for the Exchange of Flow Information", dated Sep. 2013, 76 pages.

Bishop, Christopher, "Exact Calculation of the Hessian Matrix for the Multi-layer Perceptron", Published in Neural Computation 4 No. 4 (1992), 8 pages.

Barroso et al., "The Datacenter as a Computer", An Introduction to the Design of Warehouse—Scale Machines, Morgan and Claypool Publishers, dated May 2009, vol. 24, 156 pages.

Kocberber, U.S. Appl. No. 16/156,925, filed Oct. 10, 2018, Notice of Allowance and Fees Due, dated Nov. 29, 2021.

Kocberber, U.S. Appl. No. 16/144,912, filed Sep. 27, 2018, Non-Final Rejection, dated Jun. 23, 2022.

* cited by examiner

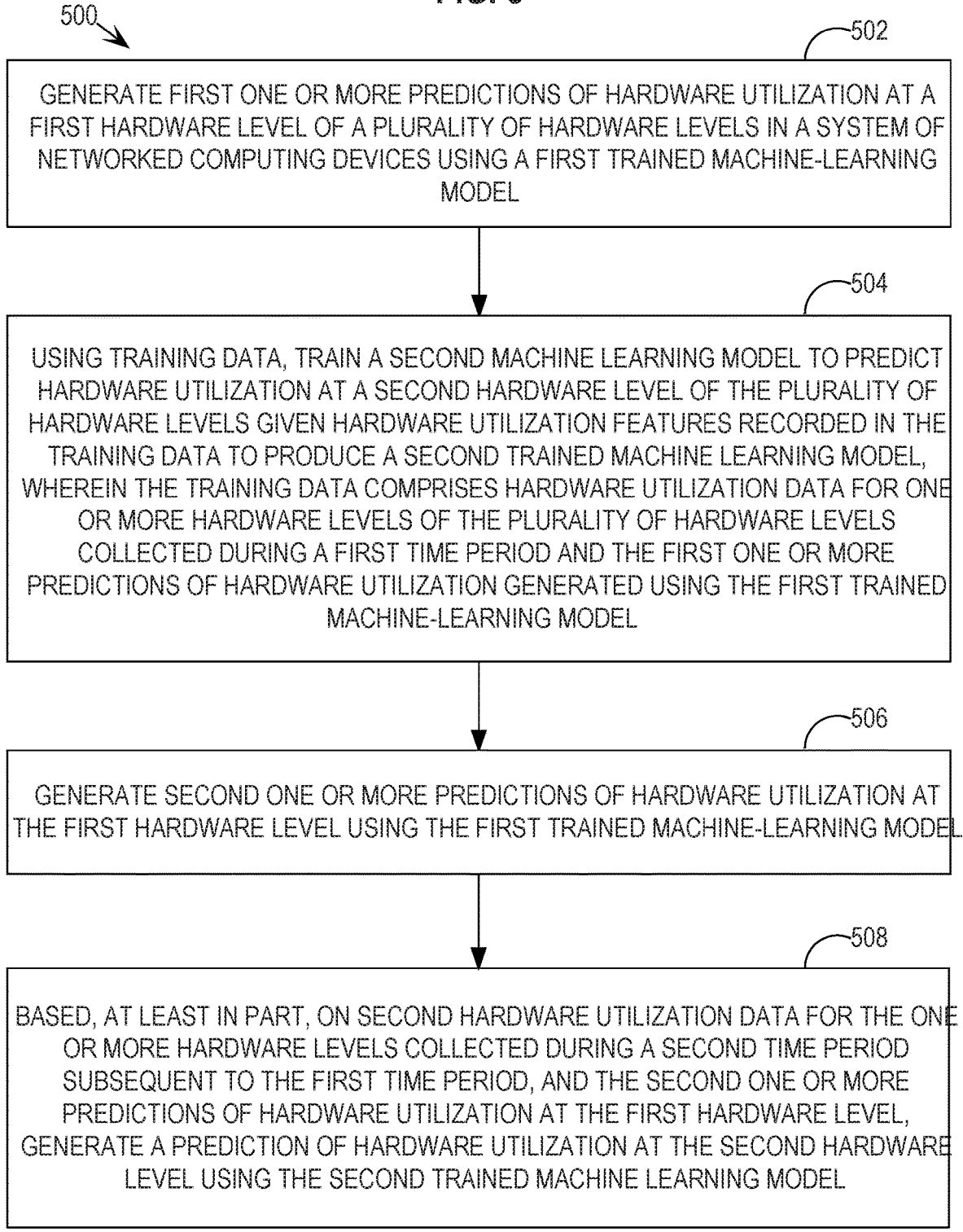

| Sensor Name 310 | Sensor Type 320 |
|---|---|
| /SYS/VPS_MEMORY | Memory Power |
| /SYS/VPS_FANS | Power to Fans |
| /SYS/VPS_CPU | Processor Power |
| /SYS/VPS | Overall Chassis Power |
| /SYS/T_AMB | Ambient Temperature |
| /SYS/T_CORE_NET | Temperature of Network Interface on Motherboard |
| /SYS/MB/T_OUT_A | Outlet Temperature at location A on Motherboard |
| /SYS/MB/F3/TACH | Speed of Fan 3 on Motherboard |
| /SYS/MB/F2/TACH | Speed of Fan 2 on Motherboard |
| /SYS/MB/F1/TACH | Speed of Fan 1 on Motherboard |

DATACENTER LEVEL UTILIZATION PREDICTION WITHOUT OPERATING SYSTEM INVOLVEMENT

CROSS-REFERENCE TO RELATED APPLICATIONS

This application is related to U.S. patent application Ser. No. 16/156,925, titled "Out-of-Band Server Utilization Estimation and Server Workload Characterization for Datacenter Resource Optimization and Forecasting" (referred to herein as the "Out-of-Band Server Utilization Estimation" application), filed Oct. 10, 2018, the entire contents of which are hereby incorporated by reference as if fully set forth herein.

FIELD OF THE INVENTION

The present invention relates to using machine learning models to predict hardware utilization in a datacenter comprising a network of computing devices and, more particularly, to predicting hardware utilization at the datacenter level.

BACKGROUND

As the demand for cloud services increases, the load on datacenters implementing cloud services increases accordingly. Understanding how various components of such datacenters are utilized is important, not only from the monitoring perspective, but also to maintain optimal performance of the datacenter hardware by keeping the utilization of datacenter resources within optimal limits and also by replacing or reconfiguring under-performing resources. Datacenter providers base provisioning for future expansions and projected future high-utilization events, at least in part, on the current and historical utilization of datacenter resources.

Generally, datacenters provide cloud services by contracting to provide certain levels of service to clients. For example, datacenter administrators make guarantees about the access that certain clients will have to datacenter services including, guarantees of a certain amount of network bandwidth, guarantees of processing power dedicated for the client's use, and sometimes guarantees of privacy and exclusive access to particular hardware of the datacenter such as for "bare-metal" client contracts. These datacenters may allocate and reallocate hardware resources, as needed, to fulfill the guaranteed levels of service to the clients. Performing utilization monitoring for such datacenters is not easy given that cloud service providers do not control the utilization of the datacenter hardware by the clients.

For example, server utilization information is often generated by operating systems running on computing devices in the datacenter, and the operating system-generated utilization information is monitored with various operating system tools. However, acquiring operating system-generated utilization information may contribute to a reduction in server security and/or negatively affect server device performance. Specifically, acquiring utilization information from an operating system requires executing instructions on the host CPU, and those CPU cycles are no longer available to clients. Although the acquisition may have a negligible overhead on powerful superscalar processors, the acquisition operations may use significant bandwidth of more lean, energy-efficient processors.

Furthermore, some datacenters provide so-called "bare-metal" cloud service (e.g., implemented using Oracle Cloud™ Infrastructure), which involves renting out the datacenter hardware itself with guarantees that the rented hardware will be used only by the renter. These guarantees generally prohibit utilization of the rented hardware by the cloud service provider. Thus, for bare-metal servers, customers are provided full control of the operating systems running on their rented machines. In such cases, accessing the server utilization information via operating systems running on the hardware being monitored is prohibited. Thus, it is even more difficult for a bare-metal cloud service provider to gather hardware utilization information because, not only does a bare-metal cloud provider not control utilization of the rented hardware, a bare-metal cloud provider may not run applications on bare metal-contracted hardware to allow access any operating system-generated utilization information.

The lack of insight into utilization of and performance of datacenter resources hampers proper management of these resources. In a cloud datacenter, lack of knowledge regarding server utilization makes resource allocation, capacity planning, maintenance planning, demand forecasting, and certain security operations very challenging. Given a lack of information about datacenter resource utilization (and subsequent inability to accurately predict the needs of the clients), cloud service providers sometimes prevent overstressing the datacenter resources by over-provisioning the resource capacity of the datacenter. Overprovisioning ensures that the data center hardware will be able handle any potential high utilization spikes or unexpected client requests for additional resources. However, over-provisioning a datacenter can be very expensive, and may not be necessary to meet client needs.

As an alternative to over-provisioning, cloud service providers sometimes wait for client complaints regarding system deficiencies to provide information about what remedial actions are needed to remedy datacenter resource issues. However, waiting for client feedback is sub-optimal because the client must necessarily be affected by datacenter resource deficiencies before the cloud service provider is informed of the deficiencies and thereby able to take the needed remedial steps. This arrangement affects the relationship between provider and client, and may result in disgruntled clients moving their business elsewhere, at significant cost to the service provider.

As such, given the privacy and performance needs of clients of a cloud service provider, it would be beneficial to allow a cloud service provider to gather and utilize valuable datacenter resource utilization information without requiring the service provider to run software on the resources utilized by the client. Furthermore, it would be beneficial to forecast utilization of datacenter resources without stressing client devices, which would facilitate avoidance of future potential networking and hardware issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 5 depicts a flowchart for training a given machine learning model to predict utilization of a given level of datacenter hardware based on training data that includes one or more predictions of utilization of a different level of the datacenter hardware by another trained machine learning model, and then using the given trained machine learning model to predict utilization of the given level of the datacenter hardware.

FIG. 6 depicts an example of types of sensor data received from an out-of-band sensor subsystem of a computing device.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In order to fulfill guarantees made to clients regarding levels of service (including bare-metal service) of hardware within a datacenter, the datacenter must have sufficient hardware to fill the client demand. Furthermore, it is important to configure the datacenter hardware to run efficiently, and also to ensure that the various clients of the datacenter do not interfere with network bandwidth or processing power guarantees made to the other clients. Thus, in order to provide information needed to properly provision and configure datacenter hardware to meet the needs of datacenter clients, embodiments use machine learning models to predict future hardware utilization of a datacenter at the various hardware levels of the datacenter, including predicting hardware utilization at the datacenter level.

Figure 1:
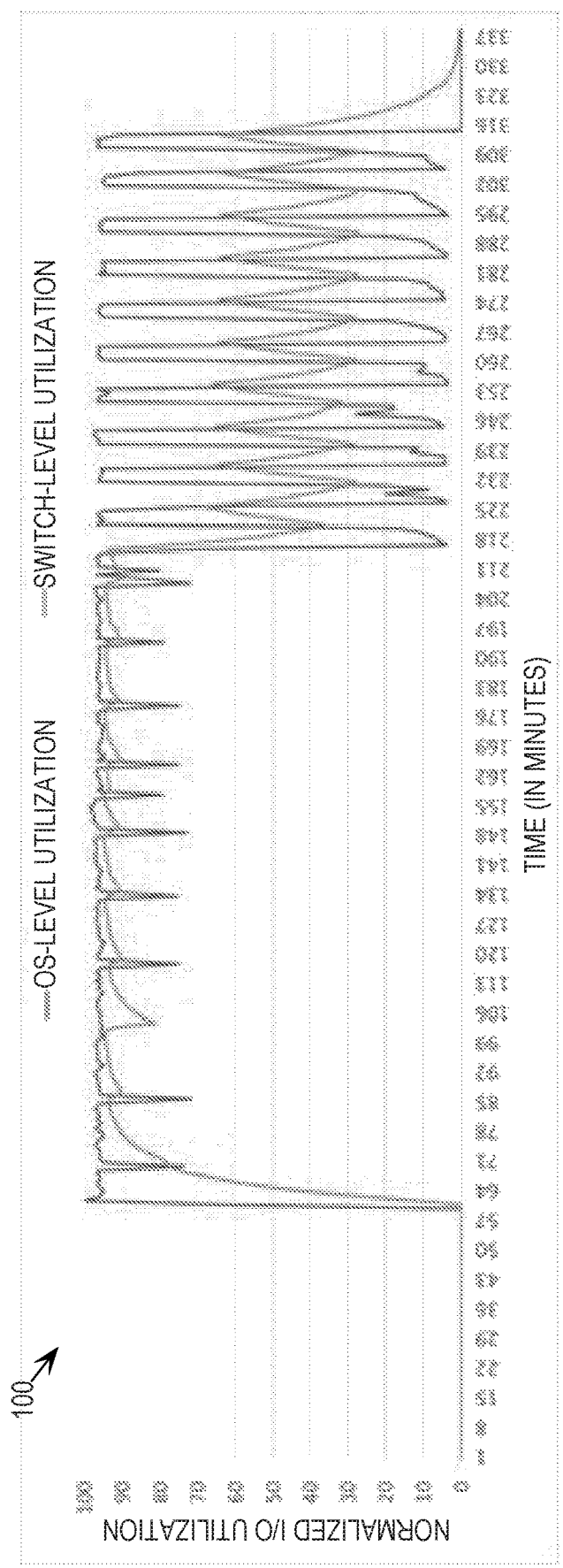
FIG. 1 depicts a plot of network utilization data observed at the ToR switch level and at the server device level of a datacenter.

In the absence of operating system-generated utilization information, it is difficult to train a machine learning model to predict utilization of the higher levels of datacenter hardware in a datacenter system. Specifically, hardware utilization data generated by non-operating system ("non-OS") sources includes inaccuracies, especially for data gathered regarding utilization of higher levels of hardware in the datacenter. To illustrate, the plots 100 of data points depicted in FIG. 1 show that the network utilization observed at the ToR switch level takes time to catch up with the actual network utilization observed at the server device level (as measured by operating system-based sources, for purposes of illustration), especially when the network utilization fluctuates.

These inaccuracies can affect the ultimate accuracy of predictions of models that are trained on the utilization statistics observed at the switch level, especially when the training data includes information gathered from a large number of different switches. In addition to a lag in detecting network utilization at the different levels of a datacenter, as depicted in FIG. 1, other causes that could introduce further inaccuracies at the datacenter scale include: different frequencies at which data is collected from sources; unexpected failures of data sources or collectors; different ways information is aggregated; and differences in clock-times of different devices.

The inaccuracies inherent in many kinds of non-OS generated hardware utilization data, and also the relative scarcity of data points that are able to be gathered from non-OS sources, prevent accurate correlation of current data patterns with future utilization behaviors by ML models, especially predicting behaviors at the higher hardware levels of the datacenter. The difficulties with non-OS-based utilization data at the higher levels of datacenter hardware result in less-than-precise predictions of high-level datacenter hardware behavior.

In order to produce more accurate datacenter-level utilization predictions, embodiments train a hierarchy of machine learning models (also referred to herein as simply "models") to predict datacenter behavior at the multiple hardware levels of the datacenter. The accuracy of higher-level models in the hierarchy of models is increased by including, as input to the higher-level models, hardware utilization predictions from lower-level models. Including lower-level predictions in input to higher-level ML models provides the higher-level models with additional data points, and also gives the higher-level models the benefit of the accuracy of the lower-level predictions Non-OS sources of utilization information can produce a greater variety of accurate utilization information for server devices in a datacenter than is able to be produced for the higher hardware levels of the datacenter. As such, models that predict utilization of the server device level of a datacenter, such as ML models that predict utilization of particular server devices, have access to a greater variety of server device-level utilization information that is not generated by an operating system. Therefore, these lower-level models produce predictions at a high level of accuracy, and embodiments leverage the accuracy of these predictions to increase the accuracy of the higher-level models in the model hierarchy.

According to an embodiment, the hierarchy of models includes: server utilization models and workload/OS prediction models that produce predictions at a server device-level of a datacenter; and also top-of-rack (ToR) switch models and backbone switch models that produce predictions at higher hardware levels of the datacenter. In addition to lower-level utilization predictions (where applicable), these models receive, as input, hardware utilization information from non-OS sources. Using non-OS sources to gather information about datacenter hardware activity does not require diversion of any percentage of processing power of computing devices allocated for client use, and also preserves any "bare-metal" guarantees made regarding the hardware.

The hardware utilization predictions provided by the hierarchy of models provide a comprehensive, and accurate, forecast of datacenter usage. Based on datacenter-level network utilization predictions, the datacenter automatically configures the datacenter hardware to avoid any predicted over-utilization of any given section of hardware in the datacenter. For example, when the hierarchy of models predicts that a certain switch in the datacenter will become a hot spot in the next three minutes, the datacenter automatically configures the datacenter hardware to route network traffic away from the switch, thereby preemptively alleviating the potential hot spot. Furthermore, the datacenter-level predictions provide administrators with trends in datacenter usage, which can help with datacenter administration and appropriate hardware provisioning without requiring over-provisioning.

Also, the information from the hierarchy of models can be used to detect anomalies of datacenter hardware behavior. Specifically, actual hardware utilization that is significantly different from predicted hardware behavior is flagged as a potential anomaly. Embodiments determine whether the potential anomaly is explained by one or more situations including recent restart of the hardware, recent change in ownership of the hardware rights, etc. If the potential anomalous behavior of the hardware is not explained, predictions from the model associated with the hardware may be given less weight until the behavior of the hardware returns to predictability. Also, the anomalous behavior may be used to identify potential security breaches or breaches of client agreements. Furthermore, information about datacenter anomalies can help with detecting and handling rare events and failures in the system, thereby improving the overall uptime and quality of service of the datacenter.

Gathering Datacenter Hardware Utilization Statistics

In order to minimize the impact of gathering hardware utilization statistics on the bandwidth available for client use within a datacenter, and to ensure compliance with even the most restrictive of client contracts (such as bare-metal service contracts), embodiments gather datacenter hardware utilization statistics from a variety of non-OS sources. A non-OS source of utilization statistics is a source of information about the utilization of datacenter hardware that is not run by an operating system on a computing device in the datacenter.

Because non-OS sources do not run on the server machine about which data is gathered, or access payloads (or even, at times, headers) of network packets, non-OS sources have minimum to zero impact on the efficiency of the hardware that is used by clients, thereby preserving the entire capacity of the rented hardware for the clients. Also, because non-OS data sources do not infringe the privacy of clients, they may be utilized to gather data about hardware to which clients have exclusive rights (such as bare-metal service).

Figure 2:
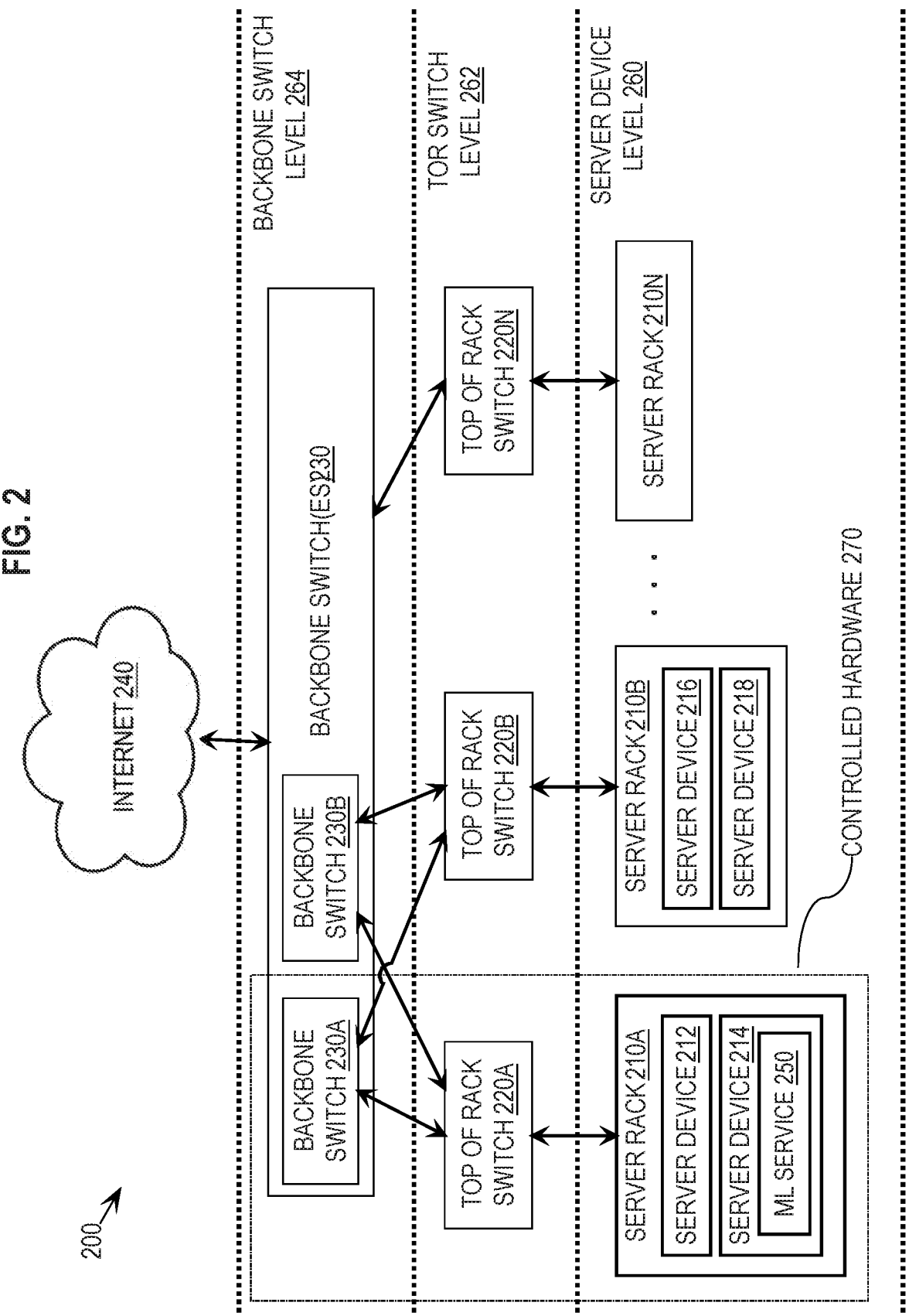
FIG. 2 depicts an example datacenter arrangement on which embodiments may be implemented.

Embodiments use non-OS sources to sample utilization statistics from the various hardware levels of a datacenter. Datacenter 200 of FIG. 2 is used herein as an example datacenter that comprises a plurality of networked computing devices. However, datacenters may have any configuration of hardware (including at least a level of hardware that includes switches/routers and another level of hardware that includes computing devices) and need not have the particular arrangement depicted in FIG. 2.

Datacenter 200 includes a server device hardware level 260 with server racks 210A-N (representing an arbitrary number of server racks in datacenter 200), each of which hosts an arbitrary number of server devices. For example, server rack 210A hosts server devices 212 and 214, and server rack 210B hosts server devices 216 and 218. Each of server racks 210A-N are associated with a respective one of top-of-rack (ToR) switches 220A-N, where the ToR switch associated with a given server rack connects the server devices in the server rack to backbone switches 230. ToR switches 220A-N comprise a ToR switch hardware level 262 in datacenter 200.

Backbone switches 230 include one or more levels of switches (including any number of intermediary backbone switches) through which network traffic flows between Internet 240 and ToR switches 220A-N. Backbone switches 230 comprise a backbone switch hardware level 264 in datacenter 200. In FIG. 2, backbone switches 230 includes particular backbone switches 230A and 230B. These backbone switches are called out for purposes of explanation, but are otherwise included in any reference to backbone switches 230 herein.

Figure 3:
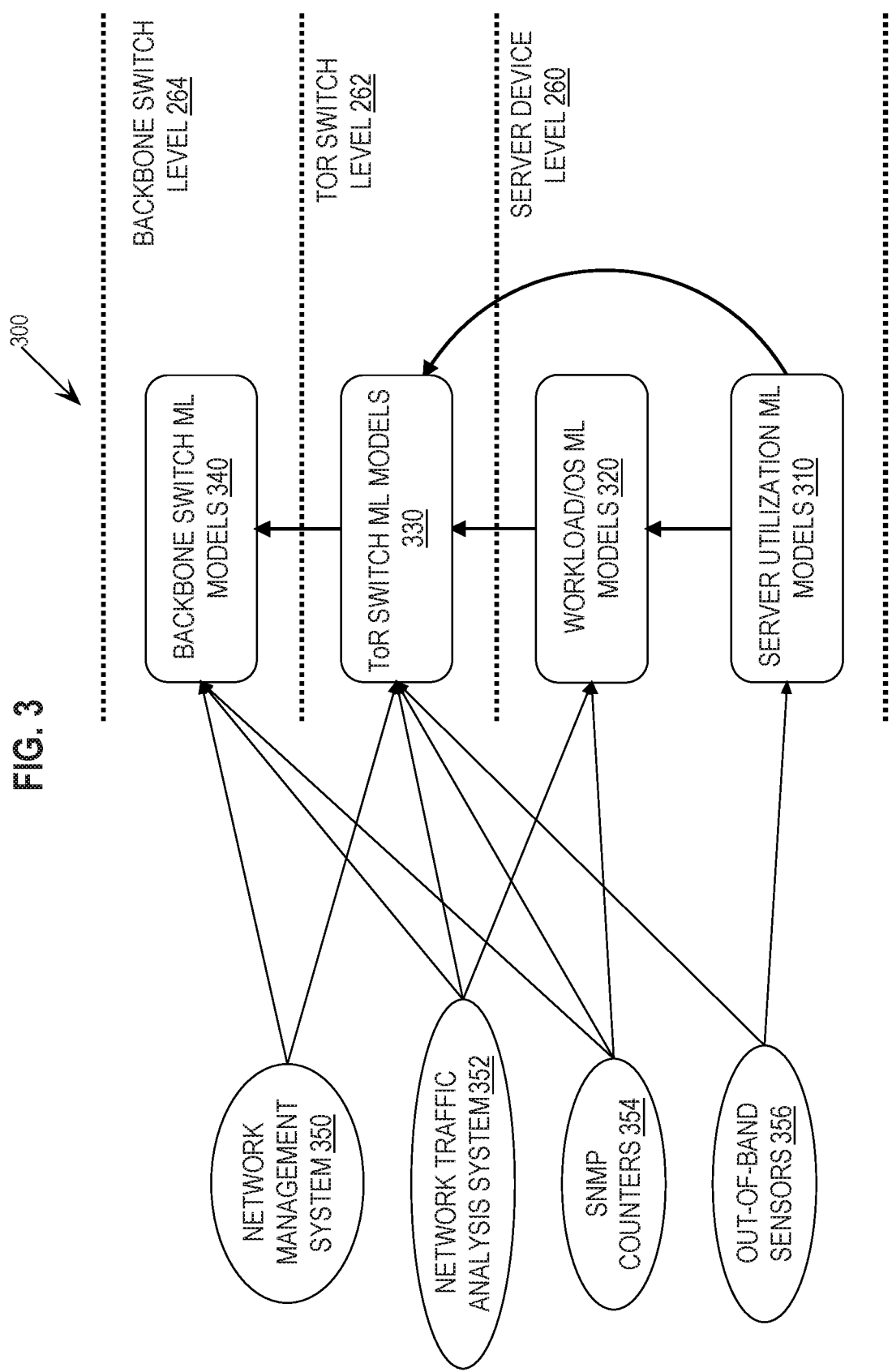
FIG. 3 depicts a hierarchy of machine learning models, each of which is trained to predict hardware utilization at a different hardware level of a datacenter.

Different non-OS sources of hardware utilization information are used in a complementary fashion to provide several types of information about datacenter hardware utilization at the various levels of datacenter hardware to give a more complete picture of hardware utilization at the datacenter scale. FIG. 3 depicts a set of non-OS sources 350-356 utilized by a hierarchy of ML models 300 as described in detail below. Out-of-band sensors 356 comprise out-of-band sensor data collection subsystems, associated with respective devices in datacenter 200, that detect information about the physical state of the associated device, including power utilization, temperature, fan speed, etc. Collecting data from out-of-band sensor subsystems, e.g., via SNMP polling, is described in further detail below.

SNMP polling is further used to gather any of a variety of network metrics stored at SNMP counters 354, such as packet sizes, throughput counters maintained by switches, etc. Also, a network traffic analysis system 352 (such as IPFIX, sFlow, or Netflow, etc.) provides information from routers and switches servicing computing devices, including information about packet flows to and from the machines, and information about packet headers (when allowed by applicable management policies), while avoiding access to packet payloads themselves. A network management system 350 (such as OpenConfig) provides information about the configuration of networking elements and the relative states of the networking elements.

A Hierarchy of ML Models

The data collected from non-OS sources at the various levels of datacenter hardware are used to train a hierarchy of ML models, each of which produces predictions regarding hardware utilization at various levels of datacenter hardware. FIG. 3 depicts a hierarchy of ML models 300 that includes server utilization ML models 310 and workload/OS ML models 320 configured to provide hardware utilization predictions for hardware at server device level 260. Specifically, a server utilization model predicts network utilization for an associated server device, and a workload/OS ML model predicts what kind of workload and operating system is running on the associated server device.

ToR switch ML models 330 are configured to provide hardware utilization predictions for hardware at ToR switch level 262. Specifically, a ToR switch model predicts network utilization of a ToR switch associated with the model. Backbone switch ML models 340 are configured to provide hardware utilization predictions for hardware at backbone switch level 264. Specifically, a backbone switch model predicts network utilization of a backbone switch associated with the model.

As depicted in hierarchy 300, predictions from trained server utilization models 310 are used as input to workload/OS models 320 and also to ToR switch models 330. Predictions from trained workload/OS models 320 are also used as input to ToR switch models 330, and, in turn, predictions from trained ToR switch models 330 are used as input to backbone switch models 340. In this manner, the predictions from lower-level models are used to increase the accuracy of the upper-level models.

FIG. 3 also indicates how hardware utilization data from non-OS information sources 350-356 is as input provide to the models at various levels of hierarchy 300. The information provided to a given ML model is used to train the model, and then is used as input to the trained model to produce hardware utilization predictions. As depicted, out-of-band sensors 356 provide information for server utilization models 310 and ToR switch models 330; SNMP counters 354 provide information for workload/OS models 320, ToR switch models 330, and backbone switch models 340; network traffic analysis system 352 provides information for workload/OS models 320, ToR switch models 330, and backbone switch models 340; and network management system 350 provides information for ToR switch models 330, and backbone switch models 340. As such, hierarchical model 300 for datacenter level utilization prediction is built incrementally, i.e., by first training server utilization models 310, and then training the higher-level models as the needed predictions become available.

The relationships between non-OS sources and models in hierarchy 300 depicted in FIG. 3 are not limiting. According to one or more embodiments, non-OS sources may be used as input to any given model in hierarchy 300, including non-OS sources that are not explicitly described herein.

Server Utilization Model

The first step of building the hierarchy of ML models 300 is to train server utilization models 310. Server utilization models are not trained using predictions from any other model, and predictions from trained server utilization models are used to train higher-level models in hierarchy 300. The Out-of-Band Server Utilization Estimation Application, referred to above, describes training and application of server utilization models in detail.

A server utilization model predicts future server utilization, memory, and network I/O utilization of a given device based on information from out-of-band sensors 356 associated with server device that detect information such as power consumption, temperature, fan speed, etc. Different types of server device utilization (e.g., I/O intensive, CPU intensive, and memory intensive) have different patterns of power consumption by the server, different temperatures of computer elements on the mother board, different fan speeds for different fans present in typical rack-mounted server configuration, etc. Thus, the sensor data collected from out-of-band sensors on a given server device provides enough information for a server utilization model to accurately draw correlations between patterns of sensor information and future device utilization to produce accurate estimates of actual future server device utilization once deployed.

The historical utilization information used to train server utilization models 310 comprises data from out-of-band sensor subsystems includes readings made at regular intervals from the subsystem over a particular period of time. There are different potential supervised regression algorithms that can be used to train a server utilization models 310 to predict future utilization of server devices, according to embodiments, such as the Random Forest Regression algorithm described in connection with training ML models in further detail below.

Deploying a Server Utilization ML Model

Figure 4:
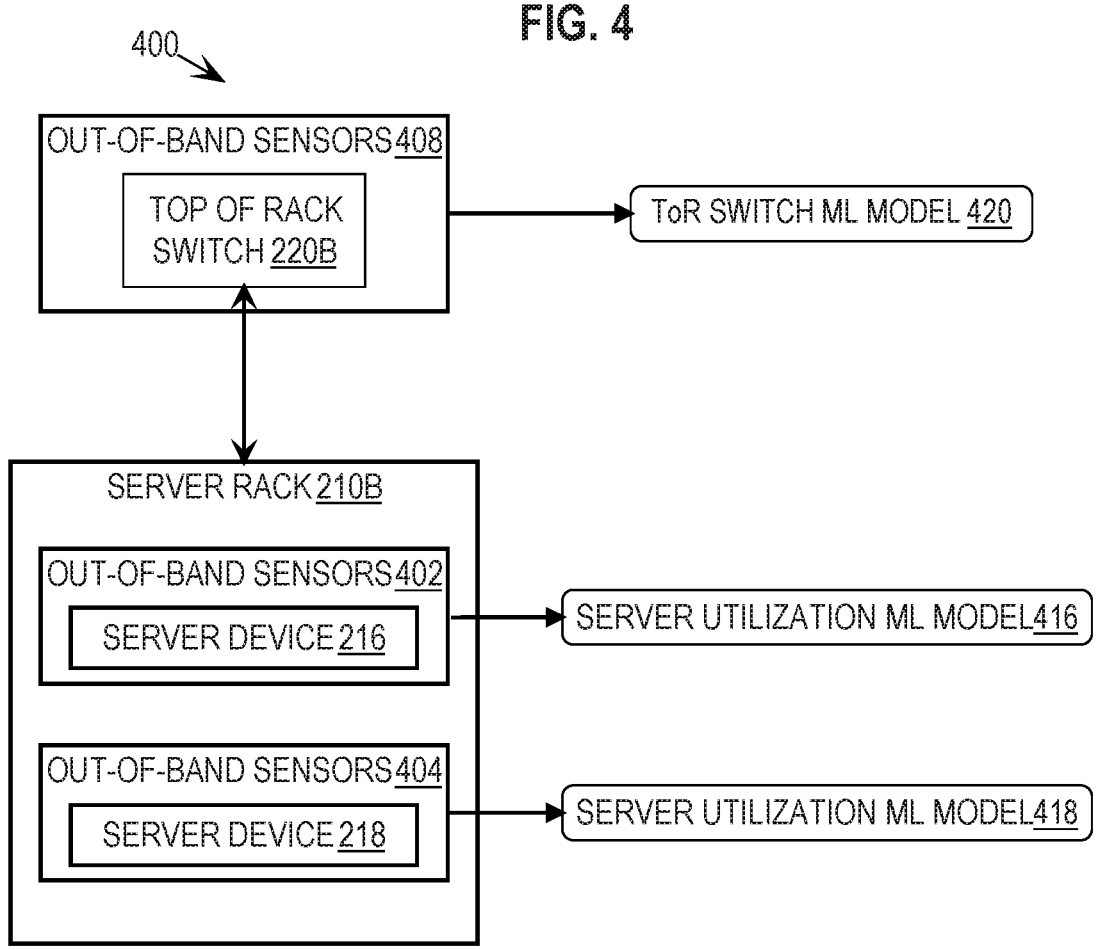
FIG. 4 depicts an example portion of a datacenter that includes a top-of-rack switch and multiple server devices, each of which is associated with a deployed machine learning model.

Once the server utilization model is trained, an instance of the trained server utilization model is deployed to each server device in the datacenter. In other words, each server device in the datacenter is associated with an instance of the trained server utilization model that then forms predictions for utilization of the associated server device. For example, FIG. 4 depicts an example portion of datacenter 200 including server rack 210B with associated server devices 216 and 218, and also ToR switch 220B. As depicted in FIG. 4, each server device in server rack 210B is associated with a respective trained server utilization ML model.

After deployment to predict utilization of a given server device, each trained server utilization ML model instance makes predictions based on readings from the out-of-band sensor subsystem of the associated server device. For example, server device 216 is associated with out-of-band sensors 402 and server device 218 is associated with out-of-band sensors 404. The readings from these out-of-band sensor sub-systems are input to the associated instance of the trained server utilization model, based on which the model produces predictions for server utilization, memory, and network I/O utilization of the associated server device. For example, server utilization model 416 receives data from out-of-band sensors 402 and, based on the data from the sensors, model 416 produces a prediction of utilization of server device 216 during a future period of time.

The initial deployed model for each server device in datacenter 200 has the same training. However, as a given server utilization model receives input from out-of-band sensors for the associated server device, the model adjusts its correlations to tailor its predictions to the associated server device. According to an embodiment, updated correlations produced by deployed server utilization models is propagated to other deployed server utilization models in the datacenter. In this way, the network of server utilization models can learn from correlations being developed by individual deployed server utilization models.

Training an ML Model Based on Lower-Level ML Model Predictions

FIG. 5 depicts a flowchart 500 for training a higher-level machine learning model of hierarchy 300 to predict utilization of a given level of datacenter hardware with training data that includes one or more predictions of utilization of datacenter hardware by a different trained ML model, and then using the trained higher-level model to predict utilization of the given level of the datacenter hardware. In a non-limiting example used to illustrate flowchart 500 below, the higher-level model is a ToR switch model and the basis model is a server utilization model. However, as depicted in FIG. 3, there are other combinations of higher- and lower-level models to which flowchart 500 applies.

At step 502, first one or more predictions of hardware utilization at a first hardware level of a plurality of hardware levels in a system of networked computing devices are generated using a first trained machine learning model. To illustrate in the context of datacenter 200 of FIG. 2 (which includes networked computing devices, such as server devices 212-218), trained server utilization model 416 of FIG. 4 receives data from instantaneous sensor readings of out-of-band sensors 402, which measures physical statistics for the associated server device 216. Based on historical server sensor data gathered during a given window of time (such as the last 10 minutes), server utilization model 416 predicts the utilization (e.g., CPU utilization, memory utilization, and network I/O utilization) of server device 216 during a future time period (such as in the next minute). Server utilization model 416 continues to produce predictions of utilization of server device 216 over a period of time.

At step 504, using training data, a second machine learning model is trained to predict hardware utilization at a second hardware level of the plurality of hardware levels given hardware utilization features recorded in the training data to produce a second trained machine learning model, where the training data comprises hardware utilization data for one or more hardware levels of the plurality of hardware levels collected during a first time period and the first one or more predictions of hardware utilization generated using the first trained machine-learning model. For example, a machine learning service 250 (FIG. 2) trains a ToR switch ML model to predict ToR switch utilization (i.e., at ToR switch hardware level 262 of the datacenter) based, at least in part, on a set of historical hardware utilization information and predictions made by one or more trained server utilization models. As an example, server device 214 of datacenter 200 runs machine learning service 250. However, machine learning service 250 may or may not run on hardware in datacenter 200, according to embodiments.

TOR Switch ML Model

Before continuing with discussion of flowchart 500, details about ToR switch ML models 330 are presented. Specifically, a ToR switch ML model is trained to predict network utilization at ToR switches based on: (a) historical hardware utilization data produced by one or more of non-OS sources 350-356; and (b) predictions from deployed server utilization models 310 and also from deployed workload/OS models 320.

According to an embodiment, training data for ToR switch ML models 330 is collected from non-OS sources 350-356 in order to capture those aspects of hardware utilization within datacenter 200 that are indicators of network traffic at a given ToR switch of datacenter 200, including:

- network utilization of a set of server devices connected to the given ToR switch;
- characteristics of the workloads and operating systems being run on the server devices;
- load balancing configuration/policies for the given ToR switch;
- trends in the physical state of the given ToR switch; and
- active flows being routed by the ToR switch.

For example, ML service 250 collects a set of historical utilization data to train a ToR switch ML model based on the functioning of each of ToR switches 220A-N over a particular period of time. This historical utilization data includes a respective set of historical data, gathered for each particular ToR switch in datacenter 200:

- switch counters from SNMP counters 354 sampled from the particular ToR switch and from one or more backbone switches 230 to which the particular ToR switch is connected;
- out-of-band sensor data from out-of-band sensors 356 detecting physical-based statistics from the particular ToR switch;
- network flow information and packet header information (wherever possible) being routed through the particular ToR switch and through any backbone switch 230 to which the particular ToR switch is communicatively connected, which is provided by network traffic analysis system 352; and
- changes in the configuration or the state of the particular ToR switch and any backbone switch 230 to which the particular ToR switch is communicatively connected, which is provided by network management system 350.

The data is sampled at regular intervals (e.g., once per minute) over the particular period of time (e.g., two hours). Because fine-grained historical data input to a ML model can provides more reliable correlations in the trained model, it is beneficial to gather statistics on which to base a ML model at regular short intervals. All sets of historical data gathered for each particular ToR switch in datacenter 200 may be used to train ToR switch ML models 330.

As indicated above, training data for a ToR switch ML model includes predictions from one or more trained ML models providing predictions of utilization of server device level 260. According to one or more embodiments, input data for ToR switch ML models 330 includes predictions from one or both of deployed workload/OS ML models 320, and from deployed server utilization models 310. The set of historical data gathered with respect to a particular ToR switch in datacenter 200 includes predictions from one or both of server utilization and workload/OS models deployed for server devices that are communicatively connected to the particular ToR switch.

For example, the set of historical data gathered for ToR switch 220B depicted in FIG. 4 includes predictions from server utilization ML models 416 and 418 associated with server devices 216 and 218, respectively (and also from any workload/OS model associated with server devices 216 and 218) that are gathered over the same time period as the historical data gathered from the non-OS sources. Like the historical data from non-OS sources, predictions from server device-level ML models is also produced at regular intervals, such as every minute.

Embodiments train ToR switch ML models 330 using labeled training data generated from the historical utilization data (as described below), and can be trained using different regression modeling algorithms (e.g., linear regression, neural network or recurrent neural network (RNN)). According to an embodiment, ToR switch models 330 are implemented as Random Forest ML models, however, embodiments are not limited to Random Forest ML models.

Training a Model Based on Labeled Training Data

According to one or more embodiments, ML models in hierarchy 300 are trained using labeled training data. In order to label a set of historical utilization data, the duration of the historical utilization data is divided into three sub-durations, thereby creating a training data subset, a validation data subset, and a testing data subset where each data subset includes data from a respective sub-duration of the historical utilization data. Each data subset of the historical utilization data contains each type of data included in the training data set for each interval in the associated sub-duration. For example, in the case of ToR switch ML models 330, each data subset includes, for each interval in the respective sub-duration, data from each of non-OS sources 350-356 and also predictions from deployed server utilization models and from deployed workload/OS models.

The following pseudocode represents an example of how labeled data can be created for given value of "training_interval" and "prediction_interval". Here "training_interval" represents how many time units of the training data set is used as a basis for producing a prediction (e.g., use 10 minutes of historical data), and "prediction_interval" represents how many time units after the training interval should a prediction represent (e.g., 1 minute in future).

```
training_interval = 10
prediction_interval = 1
for t in duration:
    training_data[t] = dataset[t, t+1, ..., t+training_interval]
    labeled_data[t] = dataset[t+training_interval+1, ...,
    t+predication_interval].util
supervised_training(training_data, labeled_data)
```

During an initial training phase, the model is trained based on the labeled training data subset to identify correlations between observed historical data and ground truths. After the initial training phase, the initially-trained model is used to perform predications on the validation data subset. The accuracy and recall of these predictions are used for further fine-tuning various parameters of the model as well as finding ideal values for "training_interval" and "prediction_interval".

In a testing phase, the model-in-training is finalized by using the test duration dataset to perform predictions. According to an embodiment utilizing a Random Forest ML training technique, multiple versions of a trained model are produced during the training phase, and the model which provides best accuracy and recall is selected as the final trained model. According to embodiments, any type of model may be trained according to these techniques.

Trained models that are deployed to perform predictions for particular hardware of datacenter 200 continue to identify patterns of live input data. As such, the trained models become specialized to the hardware for which the models respectively produce predictions.

Using a Trained TOR Switch ML Model to Perform Predictions

A respective instance of the final trained ToR switch ML model is deployed to perform network I/O utilization predictions for each ToR switch in datacenter 200. For example, an instance of a trained ToR switch ML model 420 is deployed for ToR switch 220B as depicted in FIG. 4. In order to produce predictions of utilization of ToR switch 220B, ToR switch ML model 420 requires input data that includes hardware utilization data from non-OS sources 350-356 pertaining to ToR switch 220B, and also predictions from server utilization models 416 and 418 that predict utilization of server devices that are communicatively connected to ToR switch 220B. According to an embodiment, ToR switch model 420 also receives, as input, predictions from workload/OS models that are deployed to predict the workload type and operating system running on server devices 216 and 218, not depicted in FIG. 4.

Returning to the discussion of flowchart 500, at step 506, second one or more predictions of hardware utilization at the first hardware level are generated using the first trained machine-learning model. For example, server utilization model 416 receives, as input, information from out-of-band sensors 402. Based on this input, server utilization model 416 produces one or more predictions of future utilization of server device 216.

At step 508 of flowchart 500, a prediction of hardware utilization at the second hardware level is generated using the second trained machine-learning model based, at least in part, on second hardware utilization data for the one or more hardware levels collected during a second time period subsequent to the first time period, and the second one or more predictions of hardware utilization at the first hardware level. For example, based on information generated by non-OS sources 350-356 and also on the one or more predictions of future utilization of server device 216 (as well as any other predictions by server device level ML models that are applicable to ToR switch 220B), deployed ToR switch ML model 420 produces predictions of network I/O utilization for ToR switch 220A.

Workload and Operating System ML Model

Workload/OS ML models 320 predict what kind of workload is running on a server device, and if possible, which OS is running on the server device. Predictions from workload/OS ML models 320 about the workload and the underlying OS of given server devices helps to improve the switch-level models predicting utilization at higher levels of the datacenter. Information about what workloads are being run on the datacenter also helps administrators plan provisioning for the datacenter, and also can provide red flags when particular server devices are estimated to change their workload type without any reason (see descriptions of anomaly detection below).

According to embodiments, estimations of server workload type and operating system by deployed workload/OS ML models 320 are used in connection with clustering algorithms to group the machines of datacenter 200 based on their behavior. The Out-of-Band Server Utilization Estimation Application, referred to above, describes using ML algorithms trained on ILOM-based information to transform this raw utilization information (from the ILOM) into higher-level information about workload types. This information about workload types can be used to group the machines that are doing similar work. According to an embodiment, ML algorithms about workload types (i.e., workload/OA models 320) output multi-dimensional data, and clustering algorithms work well in grouping the multi-dimensional data. Such grouping can be used to analyze trends in datacenter hardware usage and also may be used to administer the groups of devices according to the workload type needs.

Workload/OS ML models 320 are based on the fact that different types of workloads (i.e., map-reduce workloads, key-value store, bitcoin mining, transactional or analytical workloads on database, etc.) have different server utilization levels, and also different network packet-level signatures in the form of distribution of packet sizes, distribution of inter-packet gaps, and communication patterns. Also, different operating systems have different signatures when they are using networking, such as how the randomization of the initial sequence numbers for starting the TCP packets is done, how the window sizes and different flags are set, etc.

When the information from TCP headers is available, then the type of OS running on a server device can be estimated. When TCP headers of network packets are not available, estimation of a type of OS being used on a given server device is less reliable. In a bare-metal deployment scenario within the datacenter, access to TCP packet headers is likely to be restricted, and hence the OS estimation may not work reliably. According to embodiments, workload/OS models 320 deployed for server devices in datacenter 200 generate OS estimations when TCP headers are available.

Workload/OS models 320 take, as input, data from SNMP counters 354 and information about traffic flows and packets from network traffic analysis system 352, as well as utilization forecasts from deployed server utilization models. Workload/OS models 320 are trained according to any machine learning algorithm, e.g., described in connection with other ML models herein.

Unlike the other models in hierarchy 300, the training data for workload/OS models 320 is labeled with ground truth workload type and operating system information being run on the server devices on which the historical utilization information is based. Thus, the historical utilization data and labels for the data used to train workload/OS models 320 is generated from controlled experimentation, described in detail below, during which workload types and operating systems running on the server devices is known. In this way, workload/OS models 320 are trained to identify correlations between utilization data and workload type/OS of the server devices to which the models are deployed.

Trained workload/OS models 320 that are deployed to server devices with known ground truth workload types and operating systems continue to refine the correlations on which the predictions of workload type and operating system are based. According to an embodiment, these refined correlations are periodically propagated to those trained workload/OS models 320 that are deployed to server devices in datacenter 200 for which ground truth workload types and operating systems are not known. In this way, all deployed workload/OS models 320 continue to improve workload and operating system predictions over time.

Backbone Switch ML Models

Hierarchy of models 300 further includes backbone switch ML models 340. A backbone switch model predicts network utilization at one of backbone switches 230 to which the model is deployed. These predictions are based on information from the rest of the datacenter, including, either directly or indirectly, predictions from the lower-level models in hierarchy 300, thereby providing datacenter-level traffic predictions. Backbone switch ML models 340 are trained and used similarly to the ToR switch models described above, but instead of being trained using predictions from deployed server device-level models, backbone switch ML models 340 are trained based on predictions from deployed ToR switch ML models.

Backbone switch ML models 340 are based on symmetry between aggregated outgoing and incoming traffic over backbone switches in a datacenter, where traffic on any given backbone switch in datacenter 200 is a function of traffic coming from communicatively connected ToR switches, load balancing configuration at various switches in datacenter 200, and active flows being routed through the backbone switch. Thus, according to one or more embodiments, based on information that reveals these aspects of datacenter 200, traffic over backbone switches is learned using supervised machine learning algorithms.

Backbone switch ML models 340 are trained using sets of the following historical utilization information, where a respective set of historical utilization information is gathered for each particular backbone switch in backbone switches 230:

network metrics from SNMP counters 354 for each port of the particular backbone switch in datacenter 200;

network flow information collected using network traffic analysis system 352 from the particular backbone switch;

switch configuration and network state information collected for the particular backbone switch provided by network management system 350;

out-of-band sensor data from out-of-band sensors 356 detecting physical-based statistics from the particular backbone switch; and predictions of traffic, by deployed ToR switch ML models, being used to generate predictions for utilization of ToR switches on each uplink connecting it to the particular backbone switch.

According to an embodiment, because the training data set compiled for ToR switch ML models 330 includes all of this information, the training data set for ToR switch ML models 330 is supplemented with predictions from ToR switch ML models and then is utilized to train backbone switch ML models 340.

According to an embodiment, after ToR switch ML models 330 are trained, data is gathered from non-OS sources 350-354 from at least a portion of datacenter 200 over a certain period of time (as described above) along with predictions from deployed ToR switch ML models 330. This data is labeled, as described in detail above, and used to train backbone switch models 340 using regression learning algorithms (e.g., linear regression, neural network or recurrent neural network (RNN)). According to an embodiment, backbone switch ML models 340 are trained in a similar way as described above in connection with ToR switch models 330.

Instances of the trained backbone switch model are deployed to each backbone switch of backbone switches 230, where each deployed backbone switch ML model used to produce predictions of network utilization an associated backbone switch. These deployed models become specialized to the behavior of the associated backbone switches given the continued behavior of the respective switches.

According to an embodiment, predictions from all of the deployed instances of backbone switch ML models 340 are combined to forecast the datacenter level traffic. For example, when the forecasts from models of the backbone switches are reasonably accurate (e.g., there is less than a threshold percentage of deviation of predictions from actual usage), the forecasted traffic from all of the models are added together to produce a datacenter-level traffic forecast. According to an embodiment, which deals well with backbone switch predictions that include a relatively higher level of deviation, an additional datacenter-level ML model is trained to take the forecasted traffic from each backbone switch as input and to produce datacenter-level traffic predictions as output. Gathered historical data regarding datacenter-level traffic is used to train and validate this datacenter-level model.

Using the Hierarchy of Trained ML Models to Perform Datacenter-Level Predictions Predictions of network utilization at each level of datacenter 200 are used to automatically reroute network flows to avoid predicted network utilization issues. Specifically, ToR switches 220A-N and backbone switches 230 include, or are associated with, one or more network controllers that determine the paths of network packets through datacenter 200. This automatic routing of packets is facilitated by programs such as Software Defined Networking (SDN) and/or Openflow. According to an embodiment, ML service 250 uses the predictions from models from one or more levels of hierarchy 300 to find predicted traffic hotspots within the datacenter, and then uses the mechanisms provided network controllers to instruct the switches to re-route packet flows in order to avoid the predicted traffic hotspots.

The document found, at time of drafting, at www.open-networking.org/sdn-definition/includes additional information about SDN, and is hereby incorporated by reference as if fully set forth herein. Furthermore, the document found at en.wikipedia.org/wiki/OpenFlow includes additional information about Openflow, and is hereby incorporated by reference as if fully set forth herein.

To illustrate, a particular deployed backbone switch model predicts that backbone switch 230A will be utilized over a threshold hot spot percentage (e.g., 80%) in the next three minutes by a plurality of network flows being routed through switch 230A. Furthermore, another deployed backbone switch model predicts that backbone switch 230B will be utilized under a threshold low-utilization percentage (e.g., 50%) in the same future three minutes. In response to detecting the prediction of hotspot activity, backbone switch 230A automatically broadcasts a request for assistance to the other backbone switches 230.

In response to the request for assistance, and based on the projected utilization of backbone switch 230B being less than the low-utilization percentage, backbone switch 230B informs backbone switch 230A that it has capacity for an additional network flow. In response to receiving the communication from switch 230B, backbone switch 230A automatically requests that the switch (such as ToR switch 220A) that is the source of at least one of the plurality of network flows being directed to switch 230A reroute the at least one network flow from backbone switch 230A to backbone switch 230B.

In response to receiving the reroute request, ToR switch 220A automatically reroutes one or more network flows emitting from ToR switch 220A from being routed through backbone switch 230A to being routed through backbone switch 230B. In this way, traffic is automatically (and without manual intervention) rerouted from a potential hotspot prior to materialization of the hotspot, thereby avoiding slowdowns of client network flows through datacenter 200. Thus, embodiments automatically detect and prevent potential datacenter network hot spots and blockages from affecting customer service and slowing down data transmission.

Detecting Datacenter Trends

Predictions from the hierarchy of models 300 may also be used to track trends in the usage of datacenter 200. For example, the changing composition of groups of devices that are grouped according to workload type/OS predictions provides information about potential future needs of the datacenter. If the number of devices running a first type of workload shrinks over time and the number of devices running a second type of workload expands over time, administers of the datacenter may choose to provision the datacenter in order to handle trends in the datacenter workload toward the second workload type (which may require more or less processing power in the datacenter, more or differently-configured network bandwidth, etc.).

Detecting Deviation Events

Furthermore, predictions from hierarchy of models 300 may also be used to detect anomalies in datacenter usage at any level of datacenter hardware, including at the switch or server device level. According to an embodiment, a potential anomaly (referred to herein as a "deviation event") for particular hardware in the datacenter is detected when the actual usage of the hardware differs (e.g., by a threshold percentage) from the predicted utilization generated by any applicable kind of deployed ML model in hierarchy of models 300.

For example, a pre-determined deviation threshold percentage for datacenter 200 is 10%. Deployed ToR switch model 420 predicts that the maximum utilization of the switch will be 30% during a given period of time, and, during that period of time, the actual maximum utilization of switch 220B is 50%. Because the actual utilization of switch 220B during the time period is different than the prediction of switch network utilization by more than the pre-determined deviation threshold, ML service 250 automatically detects a deviation event for ToR switch 220B. Given a deviation threshold percentage of 10%, actual maximum network utilization of ToR switch 220B that is outside of the range of 20%-40% during that time would be classified as a deviation event for switch 220B.

As a further example, ML service 250 automatically detects a deviation event for server device 216 when a workload/OS model deployed for device 216 has previously predicted a particular workload type and/or OS for device 216 and then, subsequently, predicts a different workload type and/or operating system for device 216.

According to an embodiment, a deviation event is escalated to an "anomalous" event when there is no automatically-identified explanation for the deviation event. However, when an explanation is automatically identified for a deviation event, the detected deviation event is automatically de-escalated. Specifically, deviation events may be automatically explained by a recent restart of the deviating device, a recent change in client control of the device, information from an administrator that the type of deviation event is not an anomaly, or conformance of the deviation event to a known pattern of deviation events, etc.

To illustrate, a given client that controls device 216 under a bare-metal contract runs accounting services on device 216 only a few days per month, in addition to a website hosting service that the client runs on device 216 constantly. Running the accounting services in addition to the website hosting service is much more processing-intensive and somewhat more networking-intensive than running the website hosting service alone. Thus, when the client starts up the accounting services on device 216 each month, the actual utilization of device 216 differs greatly from the predicted utilization generated by server utilization model 416 (FIG. 4) given that the predicted utilization is based on the previous month of only the website hosting service running on the device.

In response to detecting a deviation event for device 216 caused by the client initiating the accounting services on the device, ML service 250 automatically determines, from a record of device restarts/failures, whether device 216 was restarted within a given amount of time before detecting the deviation event for the device. In response to detecting that device 216 was restarted within the given amount of time before detecting the deviation event for the device, ML service 250 automatically de-escalates the detected deviation event.

However, if device 216 was not restarted within the given amount of time before detecting the deviation event for the device, ML service 250 determines, from a record of client contracts, whether device 216 has been the subject of a new or changed client contract within a given amount of time before detecting the deviation event for the device. In response to detecting that device 216 was the subject of a new or changed client contract within the given amount of time before detecting the deviation event for the device, ML service 250 automatically de-escalates the detected deviation event. Furthermore, ML service 250 de-escalates the detected deviation event based on information from an administrator that the type of the deviation event is not an anomaly (as described in further detail below).

Furthermore, a deviation of actual utilization of a given device may be explained by conformance of the deviation event to a previously-established pattern of utilization of the given device. Specifically, at times, the actual utilization of particular hardware conforms to a pattern of deviation events, such as deviation events regularly triggered by the monthly initiation of accounting services on device 216 described above. A pattern of deviation events that remains constant over time is indicative of the normal course of business of the client controlling the hardware. Accordingly, ML service 250 makes a record of all detected deviation events for each device in datacenter 200, i.e., in a device-specific utilization record. A record of a deviation event includes one or more of: a timestamp of the event, a prediction for the hardware, actual utilization of the hardware, a previous workload or OS type, a subsequent workload or OS type, a deviation threshold percentage, etc.

In the case of device 216 described above, ML service 250 records, in a record for device 216, a history of deviation events detected for the device over time. Thus, the record for device 216 shows a pattern of changed utilization of the device once per month, including information about the utilization change that triggered the deviation event. When ML service 250 detects the deviation event caused by initiation of the accounting service, ML service 250 determines whether the deviation of utilization that triggered the deviation event conforms to a pattern of deviation events recorded for device 216. In this case, the deviation event conforms to the utilization pattern recorded for device 216, i.e., matching other instances of clients initiating the accounting services on device 216. Thus, ML service 250 de-escalates the deviation event. According to an embodiment, ML service 250 utilizes a deviation event pattern recorded for a first device, such as for server device 212, to de-escalate a deviation event detected for a second device, such as server device 216.

According to an embodiment, ML service 250 automatically de-escalating a detected deviation event comprises recording the de-escalated deviation event in a de-escalation log. A de-escalated deviation event is not treated as an "anomalous" event, as described in detail below. Furthermore, predictions being produced for the hardware for which the de-escalated event was detected continues to be input to higher-level models according to hierarchy 300. This allows the higher-level models to learn patterns based on new/changed behavior from lower-level hardware. Also, the model that detected the de-escalated event does not exclude the information that triggered the event from its continued learning of hardware behavior.

Escalating a Deviation Event to an "Anomalous" Event

If ML service 250 does not automatically identify an explanation for a deviation event, as described above, ML service 250 escalates the deviation event to an "anomalous" event status. To illustrate an anomalous event, a workload/OS model deployed for device 216 changes the prediction of workload type for device 216 to a 100% bitcoin mining type of workload without device 216 having undergone a restart or change of client control. This change in workload type is automatically determined to be a deviation event by ML service 250. Such a deviation event is not marked by an administrator as non-anomalous, and is not explained based on the history of deviation events recorded for device 216. Thus, ML service 250 escalates this deviation event to an anomalous event.

According to an embodiment, an anomalous event is automatically recorded in an anomaly log, and one or more administrators are automatically contacted to report the anomaly. According to an embodiment, ML service 250 receives information, from an administrator, marking the anomalous event as a non-issue, in which case the non-issue status is recorded in the anomaly log entry for the event. This non-issue status does not de-escalate the event from "anomalous" status and, as such, the event continues to be treated as an anomaly as described herein.

According to an embodiment, ML service 250 receives information, from an administrator, marking the anomalous event as an erroneous classification, i.e., indicating that the event is not an anomaly. In response to receiving this information, ML service 250 records the non-anomaly status of the event in the log entry for the event in the anomaly log, and the event is automatically de-escalated, as described above.

Furthermore, in response to receiving information that the identified event was erroneously classified as anomalous, ML service 250 records a de-escalate flag, for the particular hardware, indicating that this type of event should be de-escalated automatically. Based on a recorded de-escalate flag, any future deviation event that ML service 250 detects for the particular hardware that is of the same event type as the event marked, by administrators, as a non-anomalous will not be escalated to "anomalous" status. For example, ML service 250 records a de-escalate flag indicating that sudden spikes in compute power utilization, for server device 218, with less than a predetermined threshold magnitude should be automatically de-escalated. As another example, ML service 250 records a de-escalate flag indicating that a change in network utilization from any ToR switch should be automatically de-escalated. As another example, ML service 250 records a de-escalate flag indicating that a change in a pattern of communication from server devices in a particular set of server devices (such as those server devices residing in server rack 210B) should be automatically de-escalated.

A deviation event that is of the same type as another deviation event is an event that is triggered by the same or substantially similar deviation of predicted utilization and actual utilization. For example, two events that were triggered by detection of the same or substantially similar subsequently-predicted workload/OS type after the same or substantially similar previously-predicted workload/OS type are of the same type. As another example, two events that are triggered by a deviation between actual and predicted utilizations are of the same type when the actual utilizations of the two events are within a threshold percentage of each other, e.g., 2%, and also the predicted utilizations of the two events are within a threshold percentage of each other.

Handling an Anomalous Event

According to an embodiment, for particular hardware that is associated with an anomalous event, ML models in higher levels of hierarchy of models 300 cease to receive, as input, predictions from any model associated with the particular hardware until predictions from any applicable ML model for the particular hardware cease to trigger deviation events by deviating from actual usage of the hardware by a margin that exceeds the deviation threshold. According to another embodiment, predictions generated by ML models in higher levels of hierarchy of models 300 continue to receive, as input, predictions from models associated with the particular hardware that is associated with an anomalous event, but give the deviating predictions lower weight than non-deviating predictions (e.g., 50% weight) until the ML model predictions cease to trigger deviation events. The weight given to deviating predictions may be configured by an administrator. In this way, the effect of deviated predictions on higher levels of models in hierarchy 300 is reduced.

According to an embodiment, the weights given to deviating predictions are graduated based on the nature of the deviations. For example, the weight given to a deviating prediction is greater when the deviation from actual usage is relatively small. To illustrate, ML service 250 applies a tiered weighting system where, when a given deviation is within the range of percentages of a given tier, ML service 250 applies the weight associated with the tier to the deviating predictions (e.g., deviation under 25% of actual usage magnitude—weight applied is 75%; deviation between 25% and 50% of actual usage magnitude—weight applied is 50%; deviation between 50% and 75% of actual usage magnitude—weight applied is 25%; and no weight is given to a deviating prediction that deviates by over 75% of actual usage magnitude).

As another example the weight of deviating predictions becomes greater the longer the deviation has been present. This allows higher-level models to learn from changing behavior of lower-level hardware. Such a weighting system may also be applied in tiers in a similar manner described above. As another example, the weight given to deviating predictions is based on at what hardware level the deviation occurs. For example, smaller weight is given to deviating predictions at lower levels of hardware given that the lower-level models are generally more precise than the higher-level models in hierarchy 300 (e.g., deviation at server device-level ML models—weight applied is 25%; deviation at ToR switch-level models—weight applied is 50%; deviation at backbone switch-level models—weight applied is 75%). Multiple weighting systems may be compounded for any given deviating prediction, e.g., by multiplying the percentage weight determined by each applicable weighting system to determine a final weight to be applied to the deviating prediction.

Furthermore, the ML model that made the prediction that triggered the anomalous event is prevented from basing correlations (or continued learning of hardware behavior) on the data that triggered the anomalous event. In this way, the anomalous event is prevented from skewing the correlations being generated by the ML model.

According to an embodiment, ML service 250 automatically flags particular hardware for fraud based on detection of one or more anomalous events. For example, in the case of an anomalous event based on the workload type of a server device changing to one of a set of workload types that are indicative of fraud, ML service 250 automatically flags the server device for fraud. As another example, when a particular server device accumulates over a threshold number of anomalous events over a certain period of time, such as during an hour or over the course of 24 hours, ML service 250 automatically flags the server device for fraud. Datacenter administrators may review and clear any fraud flag, or may communicate the potential fraud to interested parties, such as higher-level administration or the customer that owns rights to the flagged server device.

According to an embodiment, configuration errors are detected by correlating the models at multiple levels. Specifically, mistakes in the configurations of networking elements (e.g., ToR switches, backbone switches) may lead to significant changes in traffic patterns, which then lead to deviating forecasts from associated ML models. According to this embodiment, deviating predictions are correlated with a historical record indicating recent configuration changes. Information about identified correlations between deviating predictions and configuration changes may be sent to an administrator for datacenter configuration correction. This way, deviating forecasts from the models of hierarchy 300 are used as an early detection system of configuration errors, which allows such errors to be corrected before the errors are able to greatly impact service provided to datacenter clients.

Furthermore, in cases where configuration changes have been made at multiple hardware levels in datacenter 200 (or have been made only at lower hardware levels), deviating predictions from ML models in hierarchy 300 can help with locating a particular level, or particular device, at which a configuration change is causing deviating predictions at higher levels of the datacenter. Specifically, according to an embodiment, ML service 250 identifies all hardware elements in datacenter 200 for which associated ML models have recently produced deviating predictions, and determines whether deviating predictions produced by one or more lower-level models explain deviating predictions produced by higher-level models. Once the lowest level of prediction failure is detected, which explains predication failures on one or more higher levels, then the configuration change on the lower-level element is identified as the likely source of cascading prediction deviations at the higher levels. Information about the source of cascading prediction deviations may be sent to an administrator for correction of the source issue.

Furthermore, information about datacenter anomalies can help with detecting and handling rare events and failures in the system, thereby improving the overall uptime and quality of service of the datacenter. The reduction in rare failures and improved uptime is a result of using ML forecasting to detect datacenter configuration problems early, and the use of drilling-down in multi-level ML model to identify a source of cascading deviating predictions to allow more accurate configuration corrections. With these two aspects, the datacenter administrator not only can detect the problems quickly, but also can identify the root cause and fix the issue before the problem causes major service disruption. This leads to overall reduction of large-scale service disruption, and hence, improvement in overall uptime and quality of service of the datacenter.

Controlled Experiments for Gathering Training Data

According to an embodiment, ML service 250 gathers training data during one or more controlled experiments conducted using a set of hardware on which the workload types and operating systems are known. Historical utilization data gathered during such experiments is used to train at least workload/OS ML models 320, since this historical data includes the needed identifications of workload types and OS systems running on the controlled server devices.

According to an embodiment, ground truth workload type and operating system type are gathered from utilization monitoring utilities, such as dstat for a Linux-based operating system, that run on the controlled server devices.

Training data gathered during such experiments is also useful to train the other types of models; experiments may be configured to include a wide range of workload types and operating systems, which provides training data to cover a wide range of possible scenarios. Thus, according to embodiments, controlled experiments are run over various workloads and benchmarks with different CPU, memory and IO utilization characteristics, as well as over a range of OS systems running on the server devices, so as to increase the breadth of the training of the models.

The controlled experiments are run over "controlled" hardware such as controlled hardware 270 (FIG. 2), i.e., where the ground truth for the associated server devices, including workload type and type of running operating system, is known during the period of time over which the experiments are run. These controlled experiments may be run at any level of datacenter 200 to gather historical training data from non-OS sources 350-356 for any model in hierarchy of models 300, as described above.

To illustrate, controlled hardware 270 includes a particular backbone switch 230A serving ToR switch 220A, which in turn serves all of the server devices in server rack 210A. For example, controlled hardware 270 is hardware on which administrators of datacenter 200 runs any number of services, such as services that may be accessed by clients of the datacenter, internally-used tools, and other services required by the administrators. As such, the hardware is controlled with an entirely known ground truth.

As a more detailed example, server device 216 has a single port on ToR switch 220A connected to server device 216. An experiment is run using server device 216 using a Windows Server operating system, and three phases of workload types run over a period of time: a first phase in an initial 60 minutes with no use of networking (to establish behavior of negligible network utilization); a second phase running a workload type that stresses the network continuously between minute 60 to minute 215 (to establish behavior at highest sustained utilization); and a third phase running another workload type that periodically stresses the network (to capture the behavior of periodic usage). FIG. 1 depicts data points, gathered from the SNMP counters over the time frame of this experiment, where the data points reflect network utilization at the server device-level and at the ToR switch level of the controlled hardware.

During controlled experiments, ML service 250 gathers historical utilization data from one or more non-OS sources (i.e., from each of sources 350-356) over a period of time (such as 24 hours) regarding hardware utilization of controlled hardware 270 in datacenter 200.

Machine Learning Model

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output, as described above. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process, such as ML service 250, executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, Matlab, R, and Python.

Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input node, the activation value is simply an input value for the input. For an activation neuron, the activation value is the output of the respective activation function of the activation neuron.

Each edge from a particular node to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation node, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of nodes in layer L−1 and L is N[L−1] and N[L], respectively, the dimensions of matrix W are N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input node. The particular input may be stored as vector. Training data comprises multiple inputs, each being referred to as sample in a set of samples. Each sample includes a value for each input node. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every node in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of nodes and/or edges determines the size of matrices needed to implement a neural network. The smaller the number of nodes and edges in a neural network, the smaller matrices and amount of memory needed to store matrices. In addition, a smaller number of nodes and edges reduces the amount of computation needed to apply or train a neural network. Less nodes means less activation values need be computed, and/or less derivative values need be computed during training.

Properties of matrices used to implement a neural network correspond neurons and edges. A cell in a matrix W represents a particular edge from a node in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., number of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptron (MLP), including matrix operations and backpropagation, are taught in a related reference "Exact Calculation Of The Hessian Matrix For The Multi-Layer Perceptron," by Christopher M. Bishop, the entire contents of which are hereby incorporated by reference as if fully set forth herein.

Model training may be supervised or unsupervised. For supervised training, the desired (i.e., correct) output is already known for each example in a training set. The training set is configured in advance by (e.g., a human expert, or via the labeling algorithm described above) assigning a categorization label to each example. For example, the training set for workload/OS models 320 is labeled, by an administrator, with the workload types and/or operating systems running on the server device at the time the historical utilization data was gathered. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e., complexity) of a momentary input may be less than the information content of the surrounding context. Thus, semantics may occur based on context, such as a temporal sequence across inputs or an extended pattern (e.g., compound geometry) within an input example. Various techniques have emerged that make deep learning be contextual. One general strategy is contextual encoding, which packs a stimulus input and its context (i.e., surrounding/related details) into a same (e.g., densely) encoded unit that may be applied to an ANN for analysis. One form of contextual encoding is graph embedding, which constructs and prunes (i.e., limits the extent of) a logical graph of (e.g., temporally or semantically) related events or records. The graph embedding may be used as a contextual encoding and input stimulus to an ANN.

Hidden state (i.e., memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection, as described in detail above.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e., reset) gate. Unlike a binary circuit, the input and output gates may conduct an (e.g., unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e., gross topology). Each step receives two inputs and outputs two outputs. One input is external activation from an item in an input sequence. The other input is an output of the adjacent previous step that may embed details from some or all previous steps, which achieves sequential history (i.e., temporal context). The other output is a predicted next item in the sequence. Example mathematical formulae and techniques for RNNs and LSTM are taught in related U.S. patent application Ser. No. 15/347,501, entitled "MEMORY CELL UNIT AND RECURRENT NEURAL NETWORK INCLUDING MULTIPLE MEMORY CELL UNITS."

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related W.I.P.O. patent application No. PCT/US2017/033698, entitled "MEMORY-EFFICIENT BACKPROPAGATION THROUGH TIME".

Random Forest

Random forests or random decision forests are an ensemble of learning approaches that construct a collection of randomly generated nodes and decision trees during the training phase. The different decision trees are constructed to be each randomly restricted to only particular subsets of feature dimensions of the data set. Therefore, the decision trees gain accuracy as the decision trees grow without being forced to over fit the training data as would happen if the decision trees were forced to be restricted to all the feature dimensions of the data set. Predictions for the time-series are calculated based on the mean of the predictions from the different decision trees.

The following is an example and non-limiting method of training a set of Random Forest models for making estimations of network I/O utilization for an example model type, i.e., a ToR switch ML model, according to an embodiment. A best trained Random Forest ToR switch ML model is selected, from a set of models resulting from the training phase, to be the basis for instances of a trained ToR switch ML model deployed to respective ToR switches in datacenter 200. ML service 250 produces a training data set for ToR switch ML models 330, as described in detail above. In some embodiments, ML service 250 preprocesses the historical utilization data gathered from the non-OS sources prior to labeling the training data that will be used to train the Random Forest ToR switch ML model. The preprocessing may include cleaning the readings for null values, normalizing the data, downsampling the features, etc.

In an embodiment, ML service 250 receives hyper-parameter specifications for the Random Forest ToR switch ML model to be trained. Without limitation, these hyperparameters may include values of model parameters such as number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

ML service 250 trains the Random Forest ToR switch ML model using the specified hyper-parameters and the training data set (or the preprocessed sequence training data, if applicable). The trained model is evaluated using the test and validation data sets, as described above.

According to embodiments, a determination is made of whether to generate another set of hyper-parameter specifications. If so, another set of hyper-parameter specifications is generated and ML service 250 trains another Random Forest ToR switch ML model having the new set of hypermeters specified. All Random Forest ToR switch ML models trained during this training phase are the set of models from which the best trained ToR switch ML model is chosen.

Out-of-Band Sensor Data Collection

Device sensor data from out-of-band sensors 356 for a given device is collected by a sub-system ("out-of-band subsystem") that is separate from the device's main processing unit. An out-of-band subsystem comprises a main controller, referred to herein as a baseboard management controller (BMC), that is connected to various components, including sensors and other controllers ("satellite controllers") distributed among different computer components.

The sensors and other satellite controllers connect to the BMC via a bus. The BMC may be accessed via a local area network or serial bus using Intelligent Platform Management Interface (IPMI) and Simple Network Management Protocol (SNMP) polling, without participation of the device's main processing unit.

BMCs can support complex instructions and provide complete out-of-band functionality of a service processor. The BMC manages the interface between operating system and/or hypervisor and the out-of-band subsystem. A BMC may use a dedicated memory to store device sensor data that stores metrics captured by sensors or satellite controllers, such metrics being about temperature, fan speed, and voltage. The sensor data may be accessed using the complex instruction set.

According to embodiments, SNMP polling is used to collect data from the out-of-band sensors of a given device. FIG. 6 depicts a Table 600 of examples of device sensors and the types of sensor data readings that may be collected from them. It depicts a column of Sensor Names 610 and a corresponding column of Sensor Types 620. The depicted sensors are a few of the many kinds of sensors that may be used, including power sensors, temperature sensors, fan-speed sensors, and power supply sensors. Suffixes and prefixes such as "MEMORY", "CPU", "FAN", "MB" refer to specific components.

Examples of out-of-band subsystems, interfacing with out-of-band subsystems, and device sensor data are described in: "Virtual Communication Interfaces for A Micro-Controller", U.S. patent application Ser. No. 10/691,071, filed by Ranen Chattejee, et al. on Oct. 21, 2003, the entire content of which is incorporated herein by reference; U.S. patent application Ser. No. 13/786,695, Power Profiling Application for Managing Power Allocation in an Information Handling System, filed by Michael A. Brundridge, et al., on Mar. 6, 2013, the entire content of which is incorporated herein by reference; and Oracle Integrated Lights Out Manager (ILOM) 3.1, Part No.: E24525-08, published by Oracle Corporation on Feb. 4, 2014, the entire content of which is incorporated herein by reference.

Architecture for Hierarchical Machine Learning Model

FIG. 2 is a block diagram that depicts an example datacenter 200 for implementing a hierarchical ML model to predict utilization at a datacenter level, according to one or more embodiments. Server device 214 is configured with ML service 250. ML service 250 may be implemented in any number of ways, including as a stand-alone application running on server device 214, web services running on the device, etc. An application, such as embodiments of ML service 250 described herein, runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

Communication between hardware of datacenter 200 may be implemented with any type of medium and/or mechanism that facilitates the exchange of information between computing devices. In an embodiment, each of the techniques described herein are performed automatically and may be implemented using one or more computer programs, other software or hardware elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
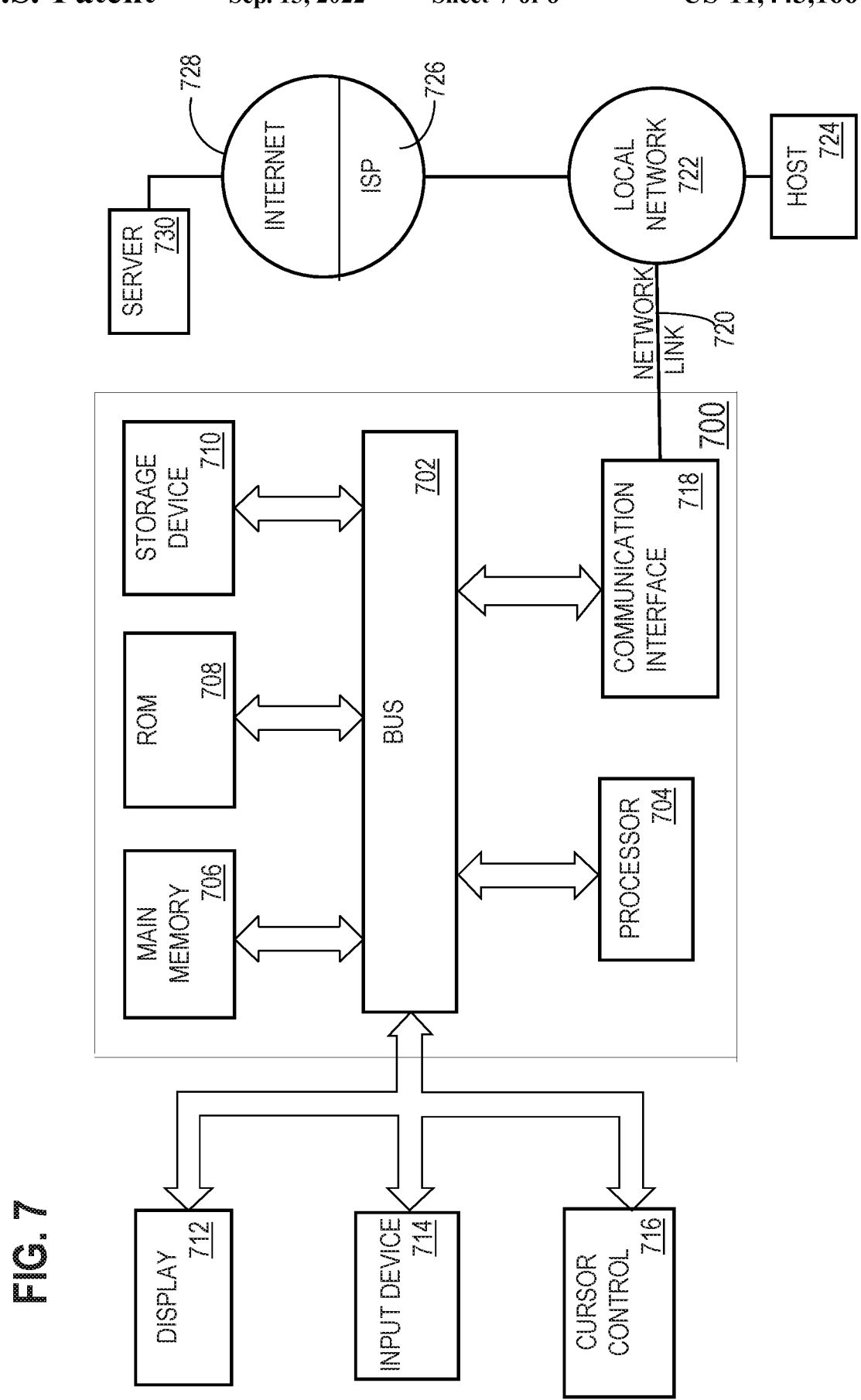
FIG. 7 depicts a computer system that may be used in an embodiment.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
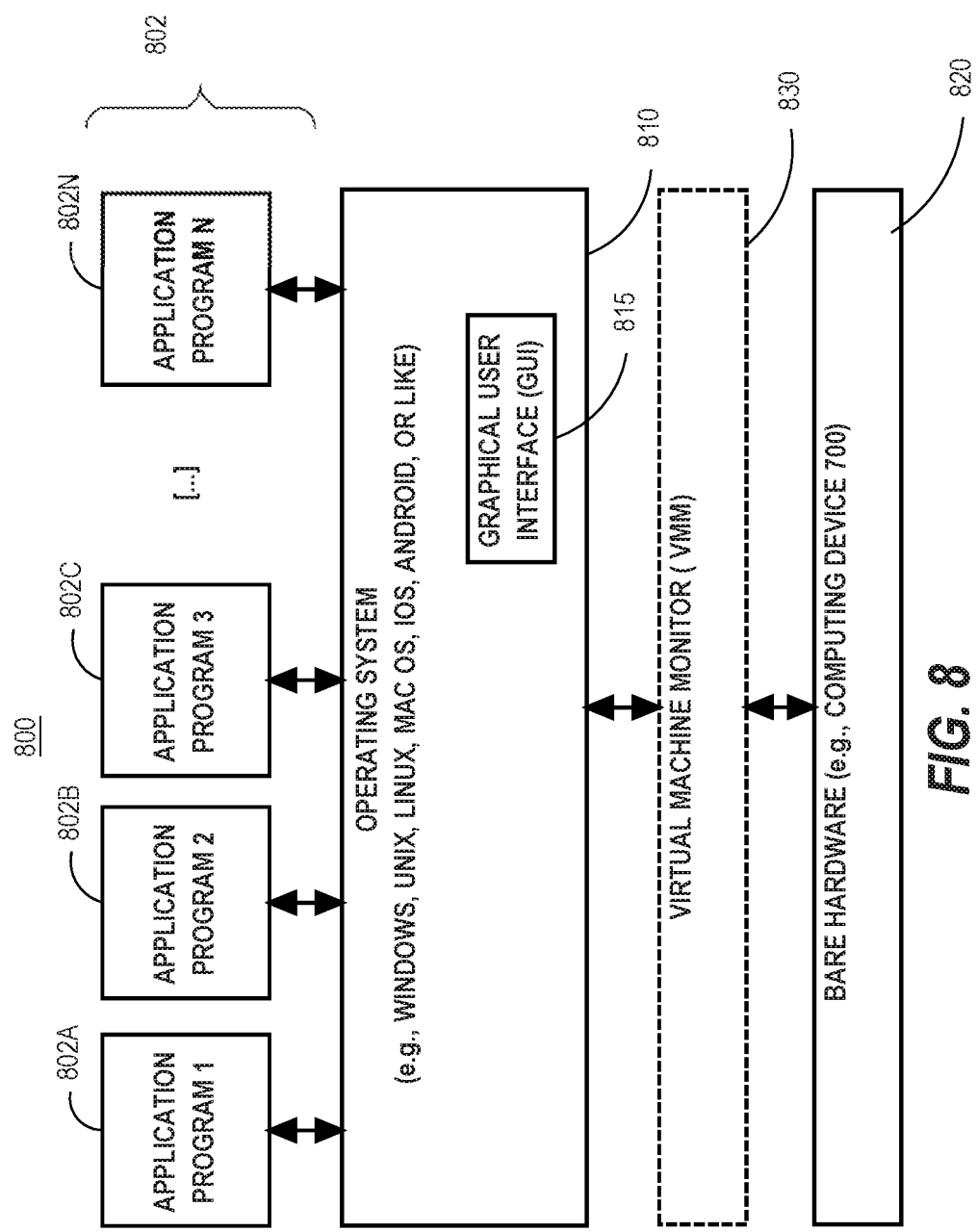
FIG. 8 depicts a software system that may be used in an embodiment.

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method, comprising:
generating first one or more predictions of hardware utilization at a first hardware level of a plurality of hardware levels in a system of networked computing devices using a first trained machine learning model;
using training data, training a second machine learning model to predict hardware utilization at a second hardware level of the plurality of hardware levels given hardware utilization features recorded in the training data to produce a second trained machine learning model;
wherein the training data comprises first hardware utilization data for one or more hardware levels of the plurality of hardware levels collected during a first time period and the first one or more predictions of hardware utilization generated using the first trained machine learning model;
generating second one or more predictions of hardware utilization at the first hardware level using the first trained machine learning model;
based, at least in part, on second hardware utilization data for the one or more hardware levels collected during a second time period subsequent to the first time period, and the second one or more predictions of hardware utilization at the first hardware level, generating a prediction of hardware utilization at the second hardware level using the second trained machine learning model;
wherein the method is performed by one or more computing devices.
2. The method of claim 1, wherein:
the first hardware level comprises a particular computing device of the system of networked computing devices;
the second one or more predictions predict utilization of the particular computing device; and
the first trained machine learning model generates the second one or more predictions based, at least in part, on input features generated from sensor data collected from an out-of-band subsystem of the particular computing device.
3. The method of claim 2, wherein:
the first and second hardware levels are the same level;
the second hardware level comprises the particular computing device of the system of networked computing devices;
the first hardware utilization data and the second hardware utilization data for the one or more hardware levels comprise one or more of: network counters, or network flow data; and
the prediction of hardware utilization at the second hardware level predicts one or more of: an operating system running on the particular computing device, or a type of workload running on the particular computing device.

4. The method of claim 2, wherein:
the second hardware level comprises a top-of-rack (ToR) switch that is communicatively connected to the particular computing device;
the first hardware utilization data and the second hardware utilization data for the one or more hardware levels comprise one or more of: input features generated from sensor data collected from an out-of-band subsystem of the ToR switch; network counters; network flow data; or network configuration information; and
the prediction of hardware utilization at the second hardware level predicts network utilization of the ToR switch.

5. The method of claim 4, further comprising:
generating first one or more predictions of hardware utilization at the second hardware level using the second trained machine learning model;
using second training data, training a third machine learning model to predict hardware utilization at a third hardware level of the plurality of hardware levels given hardware utilization features recorded in the second training data to produce a third trained machine learning model;
wherein the second training data comprises third hardware utilization data for particular one or more hardware levels of the plurality of hardware levels collected during a third time period and the first one or more predictions of hardware utilization at the second hardware level generated using the second trained machine learning model;
generating second one or more predictions of hardware utilization at the second hardware level using the second trained machine learning model;
based, at least in part, on fourth hardware utilization data for the particular one or more hardware levels collected during a fourth time period subsequent to the third time period, and the second one or more predictions of hardware utilization at the second hardware level, generating a third-level prediction of hardware utilization at the third hardware level using the third trained machine learning model.

6. The method of claim 5, wherein:
the third hardware level comprises a backbone switch that is communicatively connected to the ToR switch;
the third hardware utilization data and the fourth hardware utilization data for the particular one or more hardware levels comprise one or more of: input features generated from sensor data collected from an out-of-band subsystem of the backbone switch network counters network flow information or network configuration information; and
the third-level prediction of hardware utilization at the third hardware level predicts network utilization of the backbone switch.

7. The method of claim 6, further comprising:
generating first one or more predictions of hardware utilization at the third hardware level, representing a backbone switch level, using the third trained machine learning model;
using third training data, training a fourth machine learning model to predict hardware utilization at a fourth hardware level, representing a datacenter level, given hardware utilization features recorded in the third training data to produce a fourth trained machine learning model;
wherein the third training data comprises the first one or more predictions of hardware utilization at the backbone switch level generated using the third trained machine learning model;
generating second one or more predictions of hardware utilization at the backbone switch level using the third trained machine learning model;
based, at least in part, on the second one or more predictions of hardware utilization at the backbone switch level, generating a datacenter-level prediction of hardware utilization at the datacenter level using the fourth trained machine learning model.

8. The method of claim 1, further comprising:
based, at least in part, on a set of predictions, identifying one or more devices as a predicted network hotspot;
wherein the set of predictions includes one or more of: a set of predictions from the first trained machine learning model, or a set of predictions from the second trained machine learning model;
causing one or more network controllers to reroute one or more network flows away from the predicted network hotspot.

9. The method of claim 1, wherein:
a particular prediction, of said second one or more predictions of hardware utilization, predicts utilization of particular hardware at the first hardware level during a particular period of time;
the method further comprises:
detecting actual utilization of the particular hardware during the particular period of time;
determining whether the actual utilization of the particular hardware is within a pre-determined threshold of the particular prediction;
in response to determining that the actual utilization of the particular hardware is not within the pre-determined threshold of the particular prediction, identifying a deviation event for the particular hardware during the particular period of time.

10. The method of claim 9 further comprising:
determining whether the deviation event identified for the particular hardware is an anomalous event based, at least in part, on one or more of:
the particular hardware has been restarted within a threshold time period prior to the deviation event;
the particular hardware has changed ownership within a threshold time period prior to the deviation event; or
historical deviation event data recorded for the particular hardware.

11. The method of claim 10 wherein:
the historical deviation event data recorded for the particular hardware comprises information about one or more historical deviation events for the particular hardware; and
determining whether the deviation event identified for the particular hardware is an anomalous event is based, at least in part, on the historical deviation event data recorded for the particular hardware, and further comprises:
identifying a historical pattern of deviation events in the historical deviation event data,
determining that the deviation event fails to conform to the historical pattern of deviation events, and
in response to determining that the deviation event fails to conform to the historical pattern of deviation events, determining that the deviation event is an anomalous event.

12. One or more non-transitory computer-readable media storing one or more sequences of instructions that, when executed by one or more processors, cause:
- generating first one or more predictions of hardware utilization at a first hardware level of a plurality of hardware levels in a system of networked computing devices using a first trained machine learning model;
- using training data, training a second machine learning model to predict hardware utilization at a second hardware level of the plurality of hardware levels given hardware utilization features recorded in the training data to produce a second trained machine learning model;
- wherein the training data comprises first hardware utilization data for one or more hardware levels of the plurality of hardware levels collected during a first time period and the first one or more predictions of hardware utilization generated using the first trained machine learning model;
- generating second one or more predictions of hardware utilization at the first hardware level using the first trained machine learning model;
- based, at least in part, on second hardware utilization data for the one or more hardware levels collected during a second time period subsequent to the first time period, and the second one or more predictions of hardware utilization at the first hardware level, generating a prediction of hardware utilization at the second hardware level using the second trained machine learning model.

13. The one or more non-transitory computer-readable media of claim 12, wherein:
- the first hardware level comprises a particular computing device of the system of networked computing devices;
- the second one or more predictions predict utilization of the particular computing device; and
- the first trained machine learning model generates the second one or more predictions based, at least in part, on input features generated from sensor data collected from an out-of-band subsystem of the particular computing device.

14. The one or more non-transitory computer-readable media of claim 13, wherein:
- the first and second hardware levels are the same level;
- the second hardware level comprises the particular computing device of the system of networked computing devices;
- the first hardware utilization data and the second hardware utilization data for the one or more hardware levels comprise one or more of: network counters, or network flow data; and
- the prediction of hardware utilization at the second hardware level predicts one or more of: an operating system running on the particular computing device, or a type of workload running on the particular computing device.

15. The one or more non-transitory computer-readable media of claim 13, wherein:
- the second hardware level comprises a top-of-rack (ToR) switch that is communicatively connected to the particular computing device;
- the first hardware utilization data and the second hardware utilization data for the one or more hardware levels comprise one or more of: input features generated from sensor data collected from an out-of-band subsystem of the ToR switch; network counters; network flow data; or network configuration information; and
- the prediction of hardware utilization at the second hardware level predicts network utilization of the ToR switch.

16. The one or more non-transitory computer-readable media of claim 15, wherein the one or more sequences of instructions further comprise instructions that, when executed by one or more processors, cause:
- generating first one or more predictions of hardware utilization at the second hardware level using the second trained machine learning model;
- using second training data, training a third machine learning model to predict hardware utilization at a third hardware level of the plurality of hardware levels given hardware utilization features recorded in the second training data to produce a third trained machine learning model;
- wherein the second training data comprises third hardware utilization data for particular one or more hardware levels of the plurality of hardware levels collected during a third time period and the first one or more predictions of hardware utilization at the second hardware level generated using the second trained machine learning model;
- generating second one or more predictions of hardware utilization at the second hardware level using the second trained machine learning model;
- based, at least in part, on fourth hardware utilization data for the particular one or more hardware levels collected during a fourth time period subsequent to the third time period, and the second one or more predictions of hardware utilization at the second hardware level, generating a third-level prediction of hardware utilization at the third hardware level using the third trained machine learning model.

17. The one or more non-transitory computer-readable media of claim 16, wherein:
- the third hardware level comprises a backbone switch that is communicatively connected to the ToR switch;
- the third hardware utilization data and the fourth hardware utilization data for the particular one or more hardware levels comprise one or more of: input features generated from sensor data collected from an out-of-band subsystem of the backbone switch, network counters, network flow information or network configuration information; and
- the third-level prediction of hardware utilization at the third hardware level predicts network utilization of the backbone switch.

18. The one or more non-transitory computer-readable media of claim 17, wherein the one or more sequences of instructions further comprise instructions that, when executed by one or more processors, cause:
- generating first one or more predictions of hardware utilization at the third hardware level, representing a backbone switch level, using the third trained machine learning model;
- using third training data, training a fourth machine learning model to predict hardware utilization at a fourth hardware level, representing a datacenter level, given hardware utilization features recorded in the third training data to produce a fourth trained machine learning model;
- wherein the third training data comprises the first one or more predictions of hardware utilization at the backbone switch level generated using the third trained machine learning model;

generating second one or more predictions of hardware utilization at the backbone switch level using the third trained machine learning model;

based, at least in part, on the second one or more predictions of hardware utilization at the backbone switch level, generating a datacenter-level prediction of hardware utilization at the datacenter level using the fourth trained machine learning model.

19. The one or more non-transitory computer-readable media of claim 12, wherein the one or more sequences of instructions further comprise instructions that, when executed by one or more processors, cause:

based, at least in part, on a set of predictions, identifying one or more devices as a predicted network hotspot;

wherein the set of predictions includes one or more of: a set of predictions from the first trained machine learning model, or a set of predictions from the second trained machine learning model;

causing one or more network controllers to reroute one or more network flows away from the predicted network hotspot.

20. The one or more non-transitory computer-readable media of claim 12, wherein:

a particular prediction, of said second one or more predictions of hardware utilization, predicts utilization of particular hardware at the first hardware level during a particular period of time;

the one or more sequences of instructions further comprise instructions that, when executed by one or more processors, cause:

detecting actual utilization of the particular hardware during the particular period of time;

determining whether the actual utilization of the particular hardware is within a pre-determined threshold of the particular prediction;

in response to determining that the actual utilization of the particular hardware is not within the pre-determined threshold of the particular prediction, identifying a deviation event for the particular hardware during the particular period of time.

21. The one or more non-transitory computer-readable media of claim 20 wherein the one or more sequences of instructions further comprise instructions that, when executed by one or more processors, cause:

determining whether the deviation event identified for the particular hardware is an anomalous event based, at least in part, on one or more of:

the particular hardware has been restarted within a threshold time period prior to the deviation event;

the particular hardware has changed ownership within a threshold time period prior to the deviation event; or historical deviation event data recorded for the particular hardware.

22. The one or more non-transitory computer-readable media of claim 21 wherein:

the historical deviation event data recorded for the particular hardware comprises information about one or more historical deviation events for the particular hardware; and determining whether the deviation event identified for the particular hardware is an anomalous event is based, at least in part, on the historical deviation event data recorded for the particular hardware, and further comprises:

identifying a historical pattern of deviation events in the historical deviation event data, determining that the deviation event fails to conform to the historical pattern of deviation events, and in response to determining that the deviation event fails to conform to the historical pattern of deviation events, determining that the deviation event is an anomalous event.

\* \* \* \* \*

UNITED STATES PATENT AND TRADEMARK OFFICE
CERTIFICATE OF CORRECTION

PATENT NO. : 11,443,166 B2
APPLICATION NO. : 16/173655
DATED : September 13, 2022
INVENTOR(S) : Shinde et al.

It is certified that error appears in the above-identified patent and that said Letters Patent is hereby corrected as shown below:

On the Title Page

On page 2, Column 1, item (56) under Other Publications, Line 1, delete "Doftware" and insert -- Software --, therefor.

On page 2, Column 1, item (56) under Other Publications, Line 10, delete "lpg." and insert -- 1 pg. --, therefor.

In the Specification

In Column 2, Line 34, delete "data center" and insert -- datacenter --, therefor.

In Column 4, Line 40, delete "predictions" and insert -- predictions. --, therefor.

In Column 22, Line 43, delete "C #," and insert -- C#, --, therefor.

In Column 24, Line 30, delete "and or" and insert -- and/or --, therefor.

In the Claims

In Column 35, Line 51, in Claim 6, delete "switch" and insert -- switch, --, therefor.

In Column 35, Line 51, in Claim 6, delete "counters" and insert -- counters, --, therefor.

In Column 35, Line 52, in Claim 6, delete "information" and insert -- information, --, therefor.

In Column 38, Line 45, in Claim 17, delete "information" and insert -- information, --, therefor.

Signed and Sealed this
Twenty-first Day of February, 2023

Katherine Kelly Vidal
*Director of the United States Patent and Trademark Office*